UNITED STATES PATENT OFFICE.

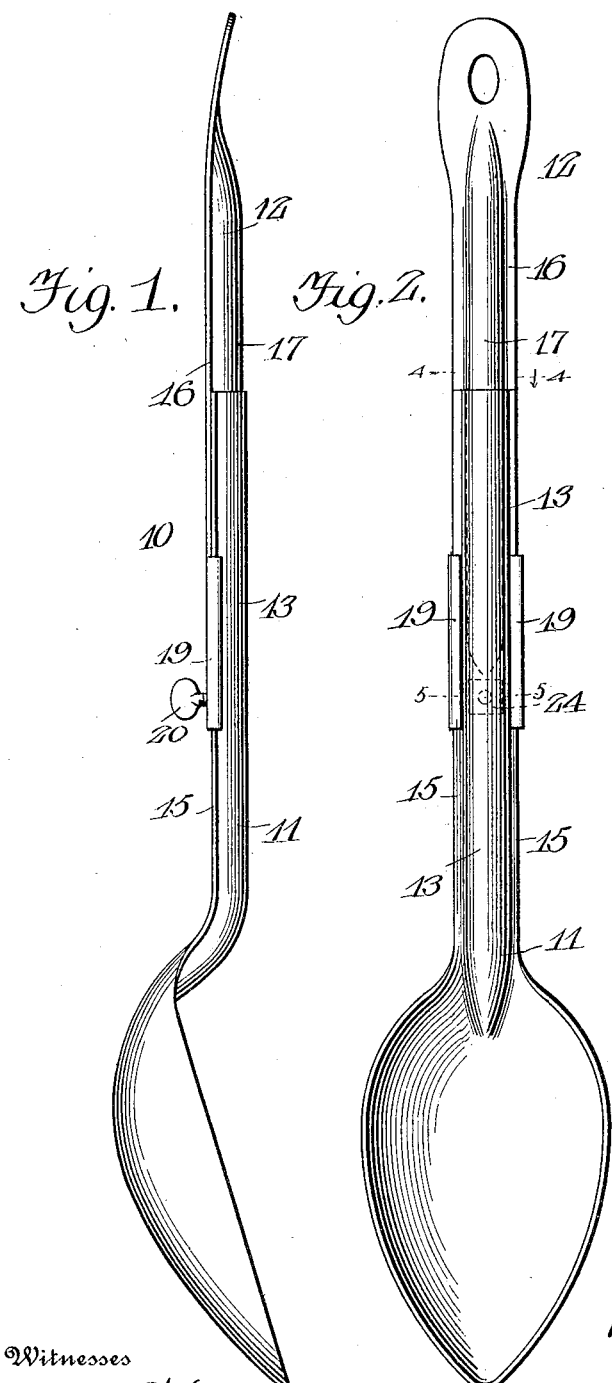

WILLIAM H. LECHNER, OF HAMILTON, ONTARIO, CANADA.

SPOON.

1,108,767. Specification of Letters Patent. Patented Aug. 25, 1914.

Application filed October 29, 1913. Serial No. 793,076.

*To all whom it may concern:*

Be it known that I, WILLIAM H. LECHNER, a citizen of the United States, residing at Hamilton, in the Province of Ontario and Dominion of Canada, have invented new and useful Improvements in Spoons, of which the following is a specification.

The invention relates to cutlery and more particularly to forks and spoons, and has for an object to provide an article of this type, the length of which can be varied for accommodating the article to different purposes in cooking and for general use in the kitchen.

The invention embodies, among other features, a spoon or similar member of an extensible nature and in which the length of the spoon can be varied for use in connection with pots and pans of various depths and sizes.

The invention further embodies an article of simple and durable construction and which can be cheaply manufactured in order to accomplish the desired result.

In the further disclosure of the invention reference is to be had to the accompanying drawings, constituting a part of this specification, in which similar characters of reference denote corresponding parts in all the views, and in which:

Figure 1 is a side elevation of the spoon; Fig. 2 is a front elevation; Fig. 3 is a fragmentary enlarged longitudinal sectional view showing the manner of connecting the sections forming the spoon; Fig. 4 is an enlarged transverse sectional view taken on the line 4—4 in Fig. 2; and Fig. 5 is an enlarged transverse sectional view taken on line 5—5 in Fig. 2.

Referring more particularly to the views, I disclose a spoon 10 consisting of a spoon section 11 and a handle section 12, the said spoon section 11 being formed to provide a shank 13 having a longitudinal groove 14, thus providing similar opposed longitudinal guides 15. The handle section 12 is formed to provide a shank 16 having a longitudinal rib 17 which is adapted to slide in the recess 14 of the spoon section 11, as will be readily seen by referring to the views.

The longitudinal rib 17 formed in the handle section 16 terminates a distance from the inner end of the handle section and between the inner end of the handle section and the inner end of the rib there is formed a flat face 18, the said handle at this point being furthermore enlarged to provide guideways 19 for the guides 15 and which slide in the guideways as shown in Figs. 4 and 5 so that the spoon section 11 will readily slide upon the handle section 12, as mentioned heretofore, the guides 15 and guideways 19 being adapted to prevent any relative lateral movement of the spoon or handle sections. A thumb screw 20 passes loosely through an opening 21 formed in the face 18 and the free end of the thumb screw is adapted to abut against the spoon section 11, a nut 24 being interposed between the face 18 and the spoon section 11 and of a size sufficient to prevent rotation of the nut as shown in Fig. 5, the said nut 24 having threaded engagement with the screw 20 so that when the screw 20 is turned up its free end will abut against the spoon section 11, thus causing the nut 24 to bind against the face 18 of the handle section 16 to relatively secure the spoon and handle sections against longitudinal movement.

It will be seen that when the screw 20 is tightened with respect to the spoon and handle sections, the said sections will be prevented from moving longitudinally relatively to each other, whereas if the screw is loosened, the spoon and handle sections can be slidably adjusted upon each other in order to increase or decrease the entire length of the spoon 10, thus making it possible to adjust the length of the spoon so that it can be easily applied to pots or pans of various depths and sizes.

From the foregoing description it will be apparent that my device consists of few and simple parts which can be cheaply manufactured and preferably stamped from sheet metal or the like and that the parts can be readily dissembled for the purposes of cleaning.

Having thus described my invention, I claim:

1. In a device of the class described, the combination with a spoon section including a longitudinal groove, of a handle section, a longitudinal rib on the handle section and slidable in the groove of the spoon section, and means carried by the handle section and adapted to engage the spoon section for holding the spoon and handle sections in relatively rigid position.

2. In a device of the class described, the combination with a spoon section having a longitudinal groove, of a handle section, a longitudinal rib on the handle section and slidable in a groove in the spoon section, guides on the spoon section, guideways on the handle section and having the guides on the spoon section slidable therein, and means for securing the spoon and handle sections in relatively rigid position.

In testimony whereof I affix my signature in presence of two witnesses.

WILLIAM H. LECHNER.

Witnesses:
CHARLES W. PROSSER,
J. E. PATERSON.

Copies of this patent may be obtained for five cents each, by addressing the "Commissioner of Patents, Washington, D. C."